Dec. 28, 1954  R. A. LEHNER  2,698,030
VALVE MECHANISM
Original Filed Aug. 26, 1948  2 Sheets-Sheet 2
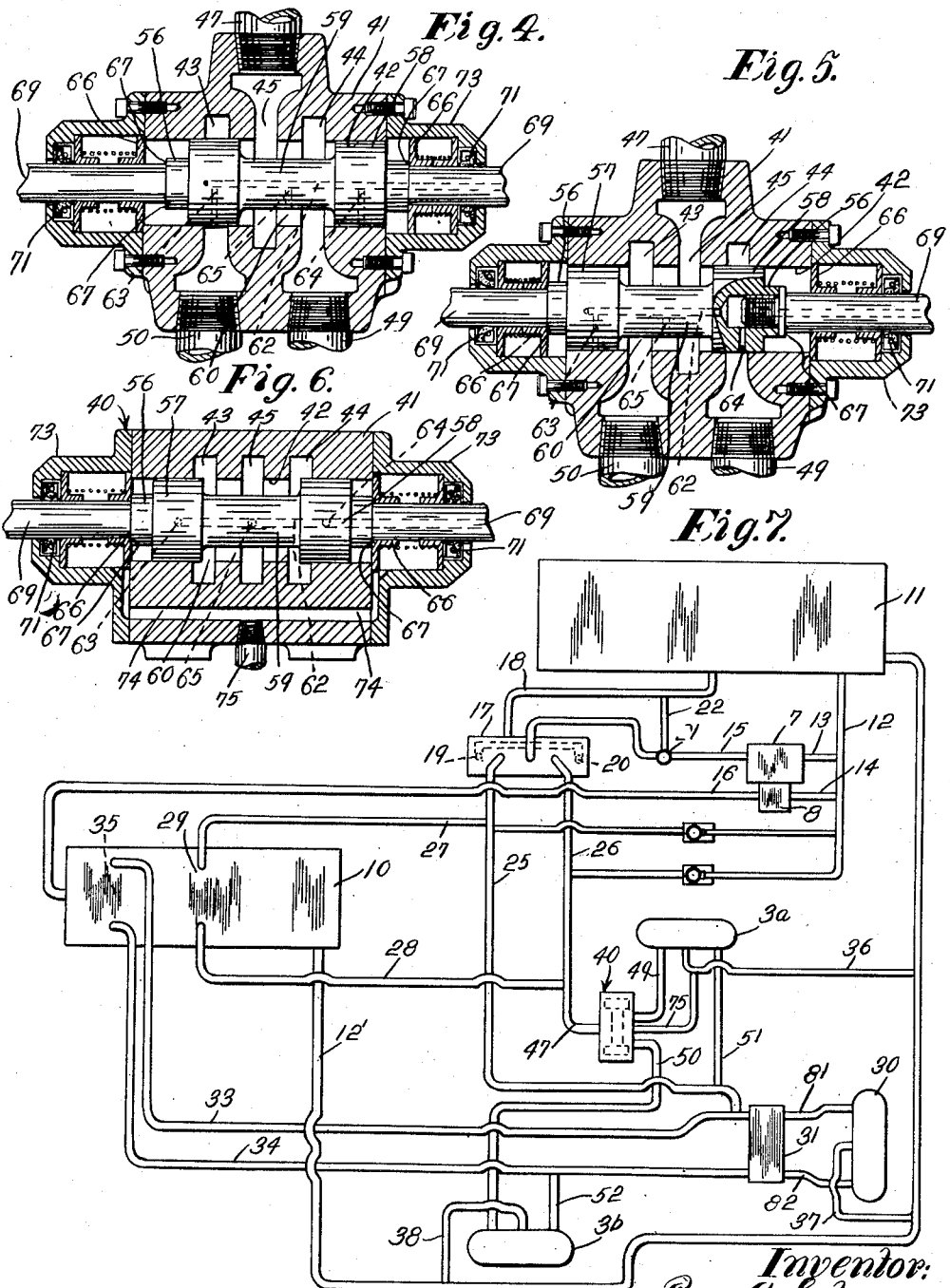
Inventor:
Ray A. Lehner.
by
Lewis A. Maxson.
Attorney.

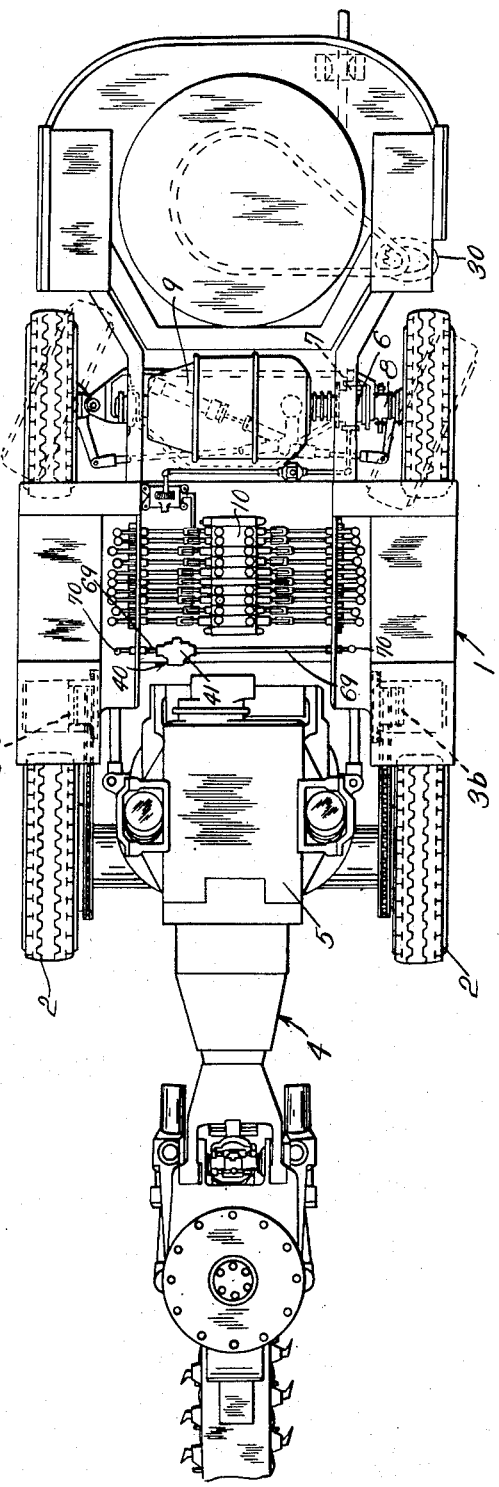

United States Patent Office 2,698,030
Patented Dec. 28, 1954

2,698,030
VALVE MECHANISM

Ray A. Lehner, Claremont, N. H., assignor to Joy Manufacturing Company, Pittsburgh, Pa., a corporation of Pennsylvania Original application August 26, 1948, Serial No. 46,207. Divided and this application July 27, 1949, Serial No. 107,083

8 Claims. (Cl. 137—625.38)

My invention relates to valve mechanisms, and more specifically to valve mechanisms adapted for association with hydraulic propulsion systems for vehicles, for restoring traction to the vehicles when certain of the driving wheels thereof skid.

In the application of Harry H. Vanderzee and Clyde P. Baldwin, Ser. No. 578,084, now Patent No. 2,562,881, there is shown a propulsion system for a coal cutting machine of the rubber-tired type in which a liquid under a relatively high pressure—several hundred pounds per square inch—is used to effect propulsion of the machine. The controlling system for the wheel drive of this machine provides for the requisite operations, but in the event that there is a loss of traction of the propulsion wheel at one side of the machine, it is necessary to take steps for the restoration of the traction of the slipping wheel or to close a manually operable stop valve in the supply line to the motor which drives the slipping wheel, in order to effect propulsion of the vehicle.

It is an object of my invention to provide an improved valve mechanism. It is another object of my invention to provide an improved valve mechanism, operator controllable, for enabling with a minimum of complication the distribution of operating medium to the wheel driving motors of a hydraulically propelled vehicle in such a manner that the major portion of the flow, when one individually motor driven wheel skids, shall be to the motor whose driven wheel is not skidding, while yet a small flow shall take place to the motor whose driven wheel is skidding, when skidding of one of the wheels is occasioned by the condition of the surface with which it coacts. Other objects and advantages of my invention will hereinafter more fully appear.

In a preferred embodiment the invention may include a casing having a fluid supply port and a pair of lines leading from the casing, valve means in the casing for connecting either of said lines separately, or both of them concurrently, in free communication with the fluid supply port, and means for establishing a restricted connection between the supply port and one of the lines when the other of the lines only is in free communication with the supply port.

In the accompanying drawings, in which one embodiment of my invention is shown for purposes of illustration and in which further there is shown an apparatus in which the illustrative embodiment of the invention is incorporated:

Fig. 1 is a view with parts broken away and other parts omitted of a kerf-cutting machine in which the illustrative embodiment is incorporated.

Fig. 2 is an elevational view of an improved control valve mechanism constituting the illustrative embodiment.

Fig. 3 is a central sectional view through the control valve mechanism of Fig. 2, on a plane perpendicular to the plane of the sheet on which Fig. 2 appears, the view being taken on the plane of the section line 3—3 of Fig. 2.

Fig. 4 is a view similar to Fig. 3 showing the control valve in one limiting position.

Fig. 5 is a corresponding view showing the control valve in its opposite limiting position.

Fig. 6 is a sectional view on the plane of the line 6—6 of Fig. 3, showing the leakage arrangements associated with the valve mechanism of Figs. 2 and 3.

Fig. 7 is a diagrammatic view showing a control system in which the valve mechanism may be used.

This application is a division of my copending application filed August 26, 1948, Serial No. 46,207, now abandoned, and entitled Propulsion System for Vehicles. The invention has been illustrated and described in association with a kerf-cutting machine in order that its mode of operation and advantages may thus more clearly appear.

Referring to the drawings, and first to Fig. 1, it will be observed that a kerf-cutting machine 1 is, as above stated, illustrated as a setting for the invention. It will be understood, however, that other hydraulically propelled vehicles may equally well be used for the incorporation of the invention. The kerf-cutting machine of Fig. 1 includes front propulsion wheels 2 having individual driving motors 3$^a$ and 3$^b$. The machine has a cutting mechanism 4 supported, adjustable and driven through mechanism illustrated in the application of Harry H. Vanderzee and Clyde P. Baldwin, Serial No. 578,084, above mentioned, drive being by means of a suitable motor 5. Propulsion of the vehicle, as well as numerous adjustments of its parts which do not enter into the present invention, but which are described in said joint application, may be effected by a dual pump mechanism 6 including a large capacity pump 7 and a small capacity pump 8, both pumps being driven by a motor 9 herein distinct from the motor 5. The hydraulic fluid pumped by the pump 8 is under high pressure and has its distribution controlled by a valve box 10 having therein numerous valve devices of which only two are of present concern. This valve mechanism is also illustrated in the application of said Vanderzee and Baldwin. The fluid pumped by the large capacity pump 7 is also under high pressure and is controlled as later described.

Referring now to the diagram of Fig. 7, it will be observed that a tank or reservoir 11 suitably supported on the vehicle 1 is connected by a conduit 12 and by branch conduits 13 and 14 respectively to the intakes of the large capacity pump 7 and of the small capacity pump 8. The pump discharges are respectively connected to conduits 15 and 16. The conduit 15 leads from the large capacity pump 7 to a manually controllable four-way valve device 17, which has its valve-receiving bore appropriately connected by a conduit 18 back to the tank 11. The conduit 18 communicates with the bore of the valve mechanism 17 at spaced points through ports 19 and 20. The large capacity pump discharge conduit 15 has a relief valve 21 therein connected by a conduit 22 to the conduit 18, and this relief valve is set to open automatically in the event that the pressure in the system exceeds a predetermined maximum, thereby to prevent overloading of the system. Conduits 25 and 26 lead from the valve receiving bore of the four-way valve device and are adapted to conduct fluid from the large capacity pump 7 to effect the propulsion of the apparatus by means of the wheel driving motors 3$^a$ and 3$^b$.

The discharge conduit 16 from the small capacity pump 8 leads to one end of the valve box 10, while an exhaust or return line 12' is connected to the other end of the valve box 10 and to the reservoir 11. Conduits 27 and 28 lead from the valve box 10 and communicate with the conduits 25 and 26 respectively, and a valve device 29, shown in detail in the above mentioned application of Vanderzee and Baldwin, is provided for selectively connecting the small pump discharge or the exhaust line 12' with the conduits 27 and 28, supply to the conduit 27 being accompanied by venting from the conduit 28, and vice versa.

For the supply of electric current to the motors 5 and 9 a hydraulic reel driving motor 30 having associated with it automatic control mechanism 31, all as described in the aforementioned copending application of Vanderzee and Baldwin, may be provided, the mechanism 31 serving to cause actuating fluid to pass through the reel driving motor 30 and to actuate the latter when the wheel driving motors 3$^a$ and 3$^b$ are being rotated in a direction to cause the vehicle to move toward the point of attachment of the cable associated with the reel, but to permit bypassing of the fluid without entering the reel driving motor 30 when the vehicle is being moved in a direction away from the point of attachment of the cable and to interconnect supply and exhaust connections for the reel driving motor so that said motor may be turned without substantial resistance during the paying off of the cable. Conduits 33 and 34 lead from the valve box 10 to the automatic control valve mechanism 31 and may be controlled by a reel motor control valve 35 of conventional form, fully described in the copending application above mentioned, to enable reel drive without propulsion wheel drive. Leakage connections 36, 37, 38 extend from wheel driving motor 3ª, reel driving motor 30, and wheel driving motor 3ᵇ respectively, to the return line 12'.

At 40 there is illustrated the valve mechanism which incorporates the illustrative embodiment of the invention. This valve mechanism includes a casing 41 having a valve receiving bore 42 therein, and with this bore there communicate surrounding grooves 43, 44 and 45. The groove 45 is connected by a conduit portion 47 with the conduits 26 and 28. The groove 44 is connected by a conduit 49 with the motor 3ª. The groove 43 is connected by a conduit 50 with the motor 3ᵇ. The motor 3ª has another conduit 51 associated with it, and this is connected with the conduits 25 and 33. The motor 3ᵇ has another conduit 52 associated with it, and this is connected with the conduit 34. Reciprocable within the bore 42 is a spool valve 56 whose heads 57 and 58 are connected by a reduced portion 59 surrounded by a groove 60 which serves in different positions of the valve to connect the groove 45 with both of the grooves 43 and 44 and with the last two grooves separately. The valve 56 is provided with means for establishing restricted connections between each of the grooves 43 and 44, the the groove 60 does not communicate with it, and the grooves 60 and 45. As shown the valve 56 has a central bore 62 into which open three radial passages; one, 63, opening through the periphery of the head 57; another, 64, opening through the periphery of the head 58; and a third, 65, opening into the groove 60. The radial passages 63 and 64 are adapted to be brought into communication with the conduits 50 and 49 in the opposite end positions of the valve 56. The valve 56 is normally centered in the position shown in Fig. 3 by spring pressed followers 66 which are adapted to coact with the end surfaces of shoulders 67 formed by cylindrical portions of the valve outside the heads 57 and 58. The valve also has oppositely extending stems of still smaller diameter 69, either of which may have operating means associated with it, and both of which have such operating means shown at 70 associated with them, as shown in Fig. 1, so that the valve may be controlled from either side of the machine. Suitable packings or seals 71 prevent leakage of fluid out of the valve casing along the operating stems for the valve. The spring centering means for the valve are housed in end boxes 73, and these are connected in communication with each other by a passage means 74, which passage means is connected by a vent conduit 75 to the vent line 12', herein by way of a connection with the vent conduit 36.

With the valve 56 in the position indicated in Fig. 7 and shown in Figs. 2, 3 and 6, it will be observed that the conduit 47 communicates freely with the conduits 49 and 50; and accordingly, if the valve mechanism 17 be controlled (Control by the valve mechanism 29 is also possible.) to effect fluid supply to the conduit 47, this fluid will flow through the conduits 49 and 50 and through the motors 3ª and 3ᵇ. The fluid supply through the motor 3ª will be discharged from the latter through the conduit 51 and will flow back through the conduit 25, valve mechanism 17 and the conduit 18 into the reservoir 11. The fluid which passes through the motor 3ᵇ will be discharged through the conduit 52 and a portion of the conduit 34 and will pass through the automatic control valve mechanism 31 without driving the reel, and then will pass also by way of the conduit 25, valve mechanism 17, and conduit 18 back to the reservoir.

It will be observed that the operation just described is the one which takes place when the apparatus is to be propelled in a direction moving away from the point of connection of the cable, at which time it is desirable that the cable be payed off of the reel, and accordingly that the reel driving motor 30 be not positively driven but rather permitted freely to rotate with its opposite fluid connections freely connected with each other.

Now if one of the propulsion motors 3ª or 3ᵇ has the wheel driven thereby spin because of its resting upon a slippery place, it will be evident that that motor whose wheel spins will take all of the fluid discharged by the pump or pumps, and accordingly there will be no traction provided by the other motor so long as the valve device 40 is not manipulated.

Let it be imagined that the motor 3ª has the tire which it is driving spinning. The machine runner will then manipulate the valve 56 in such a manner as to bring it to the position shown in Fig. 5. This will interrupt the supply of fluid to the conduit 49 directly by way of the groove 60 and will result in a free connection of the grooves 43 and 45, with the result that, were it not for the relatively small passages heretofore described, all of the fluid would go to the motor 3ᵇ, which will then be provided with abundant power and presumptively be able to move the apparatus to a point where both wheels may again exert traction.

It is not desirable to have the motor 3ª completely shut off from the fluid supply at a time when fluid is made available so freely to the motor 3ᵇ, and it is for this reason that the passages 62, 63, 64 and 65 are provided. It will be noted that in the position of the parts shown in Fig. 5, fluid will flow from the grove 45 and the groove 60 through the radial passage 65 and the longitudinal passage 62 and the radial passage 64 to the conduit 49, with the result that some fluid will be supplied to the motor 3ª, so that this motor may be caused to rotate slowly. The slow rotation will aid its wheel to regain traction, and the machine will not tend to slew to the extent that this action would take place if the motor 3ª were receiving no fluid. It will be evident that if it was the motor 3ᵇ whose driven wheel lost traction, the valve 56 would be moved to the position shown in Fig. 4, and then the motor 3ª would be operative to move the apparatus until both traction wheels took hold. A mere return of the valve 56 to the position shown in Fig. 3 will result in quick supply of fluid again to both the motors 3ª and 3ᵇ equally.

If it is desired to propel the apparatus in an opposite direction, the valve mechanism 17 or the valve mechanism 29, or both, may be manipulated to effect the supply of fluid to the conduit 25. Assuming valve mechanism 17 in control, the fluid supplied to the motor 3ª through the conduit 51 will actuate that motor and then pass through the conduit 49 and the valve mechanism 40, the conduit 47, the conduit 26, the valve mechanism 17 and the conduit 18 back to the reservoir. Moreover, fluid supplied by way of the conduit 33 will pass through the valve mechanism 31, through a conduit 81 to the reel driving motor 30, through a conduit 82 back to the valve mechanism 31, through the conduit 34, conduit 52, propulsion motor 3ᵇ, conduit 50, valve mechanism 40, conduit 47, conduit 26, valve mechanism 17, and back to the reservoir 11. It will be evident that some of the fluid returning in either case described through the conduit 47 might, when both pumps are supplying fluid, pass through the conduit 28, the valve mechanism 29 and the conduit 12' as well as directly through the conduit 25 to the valve mechanism 17.

It will have been noted that the valve mechanism 40 is now in a return line from the motors, but this does not alter its capacity to exercise the desired controls. If the motor 3ª were tending to rotate without the exertion of effective tractive effort, movement of the valve 56 to a position which would reduce the communication between the conduits 49 and 47 to that which might take place through the passages 64, 62 and 65 would result in the effecting of only a slow rotation of the motor 3ª, and the flow of the major portion of the pumped fluid through the motor 3ᵇ. In like manner, if the motor 3ᵇ had its driven wheel skid, the valve device 40 could exercise its control on the return lines from the motors 3ª and 3ᵇ, and by restricting the flow through the motor 3ᵇ would cause the major flow to take place through the motor 3ª.

The valve mechanism which has been described is obviously adapted, in the vehicle propulsion system in which it is incorporated for purposes of illustration, to enable this vehicle with which it is associated to move from a place where either propulsion wheel may have temporarily lost traction, and to effect such movement without disadvantageous slewing of the vehicle and with the application to the slipping wheel of torque at an appropriate rate to give the slipping wheel the best opportunity to regain its traction. The valve mechanism is operable from either side of the machine so that irrespective of the point at which the operator may be, he can effect the necessary control without changing his position.

While there is in this application specifically described one form which the invention may assume in practice, it will be understood that this form is shown for purposes of illustration and that the invention may be modified and

What I claim as new and desire to secure by Letters Patent is:

1. In a valve mechanism, a casing having a valve receiving chamber therein, a valve movable in said chamber, a pair of work ports opening into said chamber at points spaced apart longitudinally of said chamber, a fluid supply port opening into said chamber in a transverse zone between the openings of said pair of work ports into said chamber, said valve having spaced portions one covering one of said pair of work ports and the other covering the other thereof in the opposite end positions of said valve and said valve having a recess between said portions of a length to communicate with both of said pair of work ports at once and connect them concurrently with the supply port, said valve movable to connect said supply port with each of said pair of work ports separately from the other, and means formed on said valve providing a restricted communication between said fluid supply port and either of said work ports when the other of said work ports alone is connected to said fluid supply port, said last mentioned means including passages opening through said portions of the valve at points blanked off by said casing in a central position of said valve and having their other ends connected continuously in communication with said fluid supply port.

2. In a valve mechanism of the character described, a casing having a valve chamber therein, a valve movable in said chamber, a pair of ports opening into said chamber at spaced points therein, a supply port opening into said chamber between said first mentioned ports, said valve having spaced heads one covering one of said pair of ports and the other covering the other thereof in the opposite end positions of said valve, and said valve having between said heads a groove of a width to communicate with both of said first mentioned ports at once and connect them concurrently with the supply port, said valve movable to connect said supply port with each of said first mentioned ports separately from the other, and means formed in said valve providing a restricted communication between said supply port and either of said first mentioned ports when the other of said first mentioned ports alone is connected by said groove to said supply port, said last mentioned means including passages communicating with said groove and having outer ends opening through the heads of the valve at points spaced from said groove, said casing having portions which cover, when said valve is centered, the outer ends of said passages.

3. In a valve mechanism of the character described, a casing having a valve chamber therein, a valve reciprocable in said chamber, a pair of ports communicating with said chamber at spaced points therein, a supply port opening into said chamber intermediate said ports, said valve having spaced heads one covering one of said pair of ports and the other covering the other thereof in the opposite end positions of said valve, and said valve having between said heads a groove of a width to connect said supply port to said other ports concurrently, or with each of them separately, and means formed in said valve for providing a restricted communication between said supply port and either of said pair of ports while the other of said pair of ports alone is connected by said groove to said supply port, said last mentioned means including passages opening through the circumferential periphery of the valve at each side of said groove and within the groove, and connected with each other within said valve, said casing having portions covering the passages opening through the circumferential periphery of the valve at each side of the groove when said groove has equal communication with both of said pair of ports.

4. In a valve mechanism of the character described, a casing having a valve chamber therein, a valve movable in said chamber, a pair of ports opening into said chamber at spaced points therein, a supply port opening into said chamber between said first mentioned ports, said valve having spaced heads one covering one of said pair of ports and the other covering the other thereof in the opposite end positions of said valve, and said valve having between said heads a groove of a width to communicate with both of said first mentioned ports at once and connect them concurrently with the supply port, said valve movable to connect said supply port with each of said first mentioned ports separately from the other, and means formed in said valve providing a restricted communication between said supply port and either of said first mentioned ports when the other of said first mentioned ports alone is connected by said groove to said supply port, said last mentioned means including radial passages opening through the circumferential periphery of the valve at opposite sides of and spaced from said groove and also opening within the groove and a passage connecting said several radial passages in communication with each other, said casing having portions which cover, when said valve is centered, the radial passages which open through the periphery of the valve at the opposite sides of said groove.

5. In a valve mechanism of the character described, a casing having a fluid supply port and having a pair of work ports leading therefrom, valve means in said casing connecting either of said work ports separately or, when said valve is in midposition in said casing, both of them together, in free communication with said fluid supply port, and means closed by said casing in midposition of said valve for establishing a restricted connection between said fluid supply port and one of the work ports when the other of said work ports only is in free communication with said fluid supply port.

6. In a valve mechanism of the character described, a casing having therein a valve-receiving chamber and having a single fluid supply port opening into said chamber and a pair of work ports leading therefrom, valve means in said casing having a groove connecting either of said work ports separately, or both of them together, in free communication with said fluid supply port, means for establishing a restricted connection between said fluid supply port and either one of the work ports when the other of said work ports only is in free communication with said fluid supply port, and means for normally maintaining said valve means in a position to maintain both of said work ports in free communication with said fluid supply port.

7. In a valve mechanism of the character described, a casing having a valve chamber therein, a valve reciprocable in said chamber, work ports communicating with said chamber at spaced points therein, an intermediate supply connection opening, between said spaced points, into said chamber, said valve having spaced heads one controlling one of said work ports and the other controlling the other thereof in the opposite end positions of said valve and said valve having thereon between said heads a groove of a width to connect said supply connection to both of said work ports at once, or with each of them separately, and means formed in said valve for providing a restricted communication between said supply connection and either of said work ports while the other of said work ports alone is connected by said groove to said supply connection, said last mentioned means including restricted passage means communicating with said groove and opening through said valve at points at opposite sides of said groove.

8. In a valve mechanism of the character described, a casing having a valve chamber therein, a valve reciprocable in said chamber, work ports communicating with said chamber at spaced points therein, an intermediate supply connection opening into said chamber between said spaced points, said valve having a pair of end heads each controlling a different one of said work ports and, intermediate said heads, a groove of a width to connect said supply connection to both of said work ports at once, or with each of them separately, and means formed in said valve for providing a restricted communication between said supply connection and either of said work ports while the other of said work ports alone is connected by said groove to said supply connection, said last mentioned means including restricted passages communicating with said groove and opening through the circumferential periphery of each of said heads.

References Cited in the file of this patent

UNITED STATES PATENTS

| Number | Name | Date |
| --- | --- | --- |
| 546,589 | Doerhoefer | Sept. 17, 1895 |
| 690,611 | Roake | Jan. 7, 1902 |
| 1,172,833 | Ricker | Feb. 22, 1916 |
| 1,292,013 | Munger | Jan. 21, 1919 |
| 1,873,769 | Lang | Aug. 23, 1932 |
| 2,121,936 | Thomas | June 28, 1938 |
| 2,247,140 | Twyman | June 24, 1941 |
| 2,365,095 | Miller | Dec. 12, 1944 |
| 2,531,511 | Hill | Nov. 28, 1950 |